3,752,778
"WATER-DILUTABLE" ALKYD RESINS MODIFIED BY RADICALS OF DRYING FATTY ACIDS
Rolf Dhein, Krefeld-Bockum, Hermann Schnell, Krefeld-Urdingen, and Karl Raichle, Krefeld-Bockum, Germany, assignors to Bayer Aktiengesellschaft, Leverkusen, Germany
No Drawing. Continuation-in-part of abandoned application Ser. No. 24,866, Apr. 1, 1970. This application Oct. 4, 1971, Ser. No. 186,518
Claims priority, application Germany, Apr. 3, 1969, P 19 17 162.1
Int. Cl. C09d 3/64, 3/72
U.S. Cl. 260—22 TN                    4 Claims

ABSTRACT OF THE DISCLOSURE

The invention relates to alkyd resins modified by drying fatty acid radicals, containing urethane groups and having an acid number of from about 30 to about 70 and a hydroxyl number of from about 20 to about 120, and processes for the production thereof. Alkali, ammonia or amine salts of said alkyd resins are soluble in water and the aqueous solutions of said salts are suitable as varnishes, said varnishes and coatings obtained therefrom having advantageous properties.

CROSS REFERENCE TO RELATED APPLICATION

This application is a continuation-in-part of now abandoned U.S. application Ser. No. 24,866 filed Apr. 1, 1970.

The present invention relates to new alkyd resins and to their use in coating compositions.

The invention provides an alkyd resin modified by radicals of at least one acid of a drying oil or the conjugation or isomerization derivative thereof, containing urethane groups and having an acid number of from 30 to 70 and a hydroxyl number of from 20 to 120.

The new alkyd resins belong to the class of "water dilutable" resins. They may be used for the preparation of lacquer or varnish preparations which, when coated onto a surface, dry faster in air and yield coatings of improved resistance to water, compared with the known products of this kind.

In varnish and lacquer technology the term "water-dilutable" alkyd resins denotes those alkyd resins that form water-dilutable salts with alkalies, ammonia or amines, owing to a high content of hydrophilic groups, especially hydroxyl groups (low hydroxyl equivalent number and high hydroxyl number), optionally also of ether groups, and to a sufficient content of free carboxyl groups (high acid number).

Such water-dilutable alkyd resins with hydroxyl equivalent numbers of about 150 to 250 or more, corresponding to hydroxyl numbers of about 375 to 225, and with acid numbers of at least about 40 and optionally with other hydrophilic groups are described, for example, in Austrian patent specification No. 180,407. However, even if these resins contain radicals of drying fatty acids, the films produced therefrom dry unsatisfactorily, owing to the high content of hydroxyl groups in the resins, and the lacquer or varnish films obtained therefrom are not water-resistant on account of their high content of hydrophilic groups. According to the aforesaid patent specification, they are therefore combined with low-molecular, water-soluble (or at least hydrophilic) hardening condensation products which are prepared with the use of aldehydes and normally contain active methylol groups, such as resols or aminoplasts. However, films produced from such preparations must be heated to temperatures of about 140 to 180° C. in order that the active groups of the said condensation products react with the hydroxyl and carboxyl groups of the alkyd resins and the films thus become water-resistant. Varnish and lacquer preparations of this type are therefore classed with the stoving enamels.

The alkyd resins of the invention have a comparatively high content of hydrophilic groups, and therefore are water-dilutable in the sense explained above. Their salts, when diluted with water and applied to the surfaces to be coated, lead to coatings which, after evaporation of the water, dry superficially and thorouhgly at room temperature with remarkable speed, that is to say that they need not be baked, yielding coatings of very good resistance to water. The alkyd resins of the invention are characterized by a content of incorporated urethane groups and possibly of amide groups.

The hydroxyl groups of alkyd resins make air-drying more difficult. It is known to convert these groups into urethane groups by reaction with a monoisocyanate and thus to improve the drying of the alkyd resin lacquer or varnish films (see e.g. "The Chemistry of Organic Film Formers," John Wiley & Sons, Inc., page 212). It is also known, completely or partially to combine the hydroxyl groups of, for example, monoglycerides of drying fatty acids with one another by the reaction with a polyisocyanate, instead of with a phthalic acid anhydride as in the case of the so-called phthalate resins, to form so-called "uralkyds" (loc. cit., page 214, and Belgian patent specification No. 658,025); the lacquer and varnish films obtained thus become harder, more viscous and more flexible (loc. cit., page 215).

However, experience shows that these modifications of the properties of the alkyd resins by the incorporation of urethane groups only occur to the full extent in those resin that have low hydroxyl and acid numbers and cannot therefore be classed with the group of water-dilutable alkyd resins; they are worked up in the conventional way in solutions of organic solvents. That urethane groups in resins with hydroxyl and acid numbers above about 30, preferably between about 50 and about 100, which are water-dilutable, have only a slight influence, for example, on the air-drying properties, can be seen e.g. from French patent specifications No. 1,524,720 where so-called maleinate oils with incorporated urethane groups and with the above hydroxyl and acid numbers are described; on page 4, left-hand column, third paragraph, it is stated that the lacquer films can already be dried at temperatures between 20 and 60° C. to form non-tacky films (although this requires long drying times and the hardening is not sufficiently thorough), but that it is advisable to stove the lacquer films at about 150° C. (see also examples).

It was therefore surprising that lacquer films produced from the water-dilutable alkyd resins modified by radicals of drying fatty acids and containing urethane groups and possibly containing amide groups should, in spite of acid numbers of above 30 to about 70 and hydroxyl numbers of above 20 to about 120, superficially dry tack-free in air at room temperature already within 2 to 5 hours and thoroughly dry within about 24 hours, and that the water-resistance of the completely dry lacquer films should be comparatively very good.

The new alkyd resins characterized above can be produced by first preparing, in known manner, alkyd resins which are modified by radicals of drying fatty acids and have hydroxyl and acid numbers which are higher than those desired in the final product, and then to react them with mono- or polyisocyanates under known conditions so that part of the hydroxyl groups are converted into urethane groups and part of the carboxyl groups are possibly converted into amide groups. Since, however, the direct reaction of e.g. a dicarboxylic acid, a fatty acid or a derivative thereof and a polyalcohol yields resins of the required high acid number only with the use of a molar excess of acids, esepecially dicarboxylic acid, and since only comparatively low-molecular products are thus obtained, it is generally more advantageous first to prepare alkyd resins of higher molecular weight and with sufficiently high hydroxyl numbers but the lowest possible acid numbers, then to convert an adequate proportion of the hydroxyl groups into urethane groups with the aid of isocyanates and, finally, to convert a further proportion of the hydroxyl groups into partial esters by known methods with the aid of a dicarboxylic acid anhydride, e.g. phthalic acid or tetrahydrophthalic acid anhydride; the resins then acquire the required acid number. The resins thus prepared virtually contain only urethane groups.

Finally, it is also possible first to prepare, with the aid of dicarboxylic acid anhydrides, partial esters of high molecular alkyd resins with a high hydroxyl number and to react these partial esters with isocyanates, products with urethane and possibly with amide groups being again formed.

Unsaturated fatty acids or derivatives thereof suitable for the preparation of the alkyd resins are, for example, linseed oil, soya oil, wood oil, safflower oil, dehydrated castor oil, cotton seed oil, peanut oil, tall oil fatty acid, linseed oil fatty acid, the fatty acids of soya oil, wood oil, safflower oil or dehydrated castor oil, and the products obtained from natural unsaturated oils or fatty acids by conjugation or isomerization.

Suitable polyalcohols are, for example, glycols such as ethylene glycol, propylene glycol, butane-diols, hexane-diols, ether alcohols, such as di- and triglycols, ethoxylated bisphenols, perhydrogenated bisphenols; trimethylol-ethane, trimethylol-propane, glycerol, pentaerythritol, dipentaerythritol, mannitol and sorbitol. Primary alcohols acting as chain breakers, such as propanol, butanol, cyclohexanol and benzyl alcohol, may be added to the condensation mixture.

Examples of suitable mono- and polycarboxylic acids are, besides the fatty acids already mentioned, benzoic acid, tolylic acid, butyl-benzoic acid, hexahydrobenzoic acid, abietic acid, lactic acid, phthalic acid anhydride, isophthalic acid, terephthalic acid, tetrahydro and hexahydro-phthalic acid anhydride, trimellitic acid anhydride, pyrromellitic acid anhydride, maleic acid anhydride, adipic acid and succinic acid anhydride, and halogenated acids, such as chlorophthalic acid and HET acid (hexachloro endomethylene tetrahydrophthalic acid which is the addition product of hexachloro cyclopentadiene on maleic acid anhydride). Tetrahydrophthalic anhydrides are particularly suitable for the formation of partial esters.

Suitable isocyanates are, for example, phenyl-isocyanate, stearyl-isocyanate, cyclohexyl-isocyanate, ethylene-diisocyanate, toluylene-2,4-diisocyanate, toluylene-2,6-diisocyanate, diphenyl-methane-4,4'-diisocyanate, naphthylene - 1,5-diisocyanate, 3,3'-dichloro-4,4'-bisphenylene-diisocyanate, hexamethylene-diisocyanate and triphenyl-methane - 4,4',4''-triisocyanate, isophorone-diisocyanate, trimethyl-hexamethylene-diisocyanate, tri-isopropyl-phenyl-diisocyanate and dicyclohexyl-methane-4,4 - diisocyanate.

In order to achieve the improved properties of the lacquer and varnish coatings produced from the resins of the invention, it is expedient to react at least 2 g. of isocyanate per 100 g. of alkyd resin. If the reaction with the isocyanates is carried out in the presence of solvents, dimethyl formamide, acetone and cyclohexanone, for example, are recommended as solvents.

In addition to the new resins and the process for their production this invention also includes within its scope a salt consisting of a resin of the invention at least partially neutralized with ammonia and/or an amine and/or an alkali. The invention also includes an aqueous lacquer or varnish composition comprising such a salt.

For application of the new alkyd resins as solid substance in aqueous lacquer preparations, the free carboxyl groups of the resins are neutralized in known manner with an alkali metal hydroxide, but preferably with ammonia or an amine. As amines there may be used for example ethylamine, dimethyl- and triethylamine, amino-alcohols, e.g. mono-, di- or triethanolamine or dimethyl-ethanol-amine. A small amount of organic solvent may also be added to improve the water-dilutability of the salts and the viscosity and the flow of the aqueous compositions. Examples of such solvents are ethylene glycol monomethyl, -ethyl and -butyl ether, alcohols, esters, ketones, ketone alcohols and lower ethers, a salt being formed. The suitable degree of neutralization largely depends on the affinity of the alkyd resin for water and on the intended further processing of the aqueous lacquer or varnish composition. For alkyd resins with acid numbers above 50, a degree of only about 90% may be sufficient. In some cases it may be advantageous to carry out the neutralization in part with alkali metal hydroxides and in part with amines.

The alkyd resin salts are then expediently pasted at first with a little water, possibly with the addition of fillers, pigments and the like, on a roll mill or in a ball mill to form a paste from which the ready-to-use lacquer or varnish composition are then produced by dilution with more water and possibly with the addition of more alkyd resin salt, desiccators, flow-promoting agents, anti-foaming agents and other conventional additives.

The lacquer and varnish preparations can be applied to the substrates to be coated by any method, for example, by spraying, dipping, casting and brushing, or by electrophoresis.

After evaporation of the water and of any small amount of added solvent, the layers dry in air within a very short time and the dry varnish films harden completely within a few hours.

Although the special advantage of the new alkyd resins is fully realized when they are used as air-drying lacquer or varnish preparations, a combination of the resins with amino- or phenoplasts and therefore their use as stoving enamels is not excluded.

The parts given in the following examples are parts by weight.

EXAMPLE 1280 parts penterythritol, 3130 parts linseed fatty acid and 487 parts phthalic acid anhydride are esterified at 220° C. in a nitrogen atmosphere until the acid number is 2 and the hydroxyl number about 240 and the viscosity is 14'' (measured on a 60% by weight solution is dimethyl formamide according to DIN 53,211).

664 parts phthalic acid anhydride are added to 3940 parts of this resin and the mixture is reacted at 155° C. until a resin with the acid number 49 and the hydroxyl number about 150 has formed. The viscosity then amounts to 28'', measured on a 70% by weight solution in dimethyl formamide.

69.6 parts of a mixture of toluylene-diisocyanate-2,4- and -2,6 with a content of 65% of 2,4-isomers are then added at 50° C. to 882.8 parts of a 70% solution of the resin in dimethyl formamide. A urethane-alkyd resin with the acid number 44 and the hydroxyl number about 65 is obtained.

The reaction solution is diluted with ethylene glycol monobutyl ether to 65 percent by weight, neutralized with ammonia (33%) and adjusted with water to a solids content of 55 percent by weight. A sample diluted with water to 30% has a pH value of 8, measured with pH paper.

30 parts of this solution are mixed with 25 parts of water and a sufficient amount of metal naphthenates as desiccators that 0.02 part of cobalt, 0.02 part of manganese and 0.293 part of lead are present per 100 parts of resin.

A lacquer film produced from this lacquer dries at room temperature within 4½ hours. After 24 hours, a lacquer layer of about 45µ thickness is completely dried through.

COMPARATIVE TEST

If the toluylene-diisocyanate is replaced with an equimolar amount of phthalic acid anhydride and, in order to achieve complete conversion, esterification is carried out at a temperature of 70–80° C. which is not sufficient for the addition of isocyanate, then at 140° C. and finally at 180° C., there is obtained a phthalate resin which is free from urethane groups and has the acid number 42.

The control product is worked up into an aqueous lacquer as in the example according to the invention. Lacquer films produced from this lacquer are dry under the same drying conditions only after about 7½ hours and they are not completely dried through after 24 hours.

What we claim is:

1. An aqueous lacquer composition suitable for preparation of films that are air hardenable at room temperature comprising an alkyd resin containing alkali metal or ammonium carboxylate groups and modified by a drying oil fatty acid and by urethane groups, said resin having an acid number from about 30 to about 70 and an hydroxyl number of from about 20 to about 120 and being:

(A) the product obtained by preparing an oil modified alkyd resin having a low acid number and a high hydroxyl number, reacting part of the free hydroxyl groups of said alkyd resin with mono- or polyisocyanate in which the isocyanate groups are the sole reactive groups to obtain a second alkyd resin containing urethane groups and still having a high hydroxyl number and a low acid number, and then reacting part of the free hydroxyl groups of said second alkyd resin with dicarboxylic acid anhydride to obtain said alkyd resin having an acid number from about 30 to about 70 and an hydroxyl number of from about 20 to about 120 and at least partially neutralizing the free carboxyl groups of said alkyd resin with an alkali metal hydroxide, ammonia or an amine or (B) the product obtained by reacting an oil modified alkyd resin having a low acid number and a high hydroxyl number with a dicarboxylic acid anhydride to obtain a second partially esterified alkyd resin having an acid number of from about 30 to about 70 and a high hydroxyl number and then reacting said second alkyd resin with mono- or polyisocyanate in which the isocyanate groups are the sole reactive groups to obtain said alkyd resin having an acid number from about 30 to about 70 and an hydroxyl number of from about 20 to about 120 and at least partially neutralizing the free carboxyl groups of said alkyd resin with an alkali metal hydroxide, ammonia or an amine or (C) the product obtained by preparing an oil modified alkyd resin having an acid number from about 30 to about 70 and a high hydroxyl number and then reacting said alkyd resin with mono or polyisocyanate in which the isocyanate groups are the sole reactive groups to obtain said alkyd resin having an acid number from about 30 to about 70 and an hydroxyl number of from about 20 to about 120 and at least partially neutralizing the free carboxyl groups of said alkyd resin with an alkali metal hydroxide, ammonia or an amine.

2. The composition of claim 1 wherein said organic mono- or polyisocyanate is selected from the group consisting of phenyl-isocyanate,
stearyl-isocyanate,
cyclohexyl-isocyanate,
ethylene-diisocyanate,
toluylene-2,4-diisocyanate,
toluylene-2,6-diisocyanate,
diphenyl-methane-4,4'-diisocyanate,
naphthylene-1,5-diisocyanate,
3,3'-dichloro-4,4'-bis-phenylene-diisocyanate,
hexamethylene-diisocyanate,
triphenylmethane-4,4',4''-triisocyanate,
isophoronediisocyanate,
trimethyl-hexamethylenediisocyanate,
tri-isopropyl-phenyl-diisocyanate and
dicyclohexyl-methane-4,4'-diisocyanate 3. The composition of claim 1 wherein said dicarboxylic acid anhydride is phthalic acid or tetrahydrophthalic acid anhydride.

4. The composition of claim 1 wherein at least 2 parts by weight of isocyanate are reacted per 100 parts by weight of alkyd resin.

References Cited

UNITED STATES PATENTS

| | | | |
|---|---|---|---|
| 3,385,345 | 5/1968 | Miraldi | 260—22 T N |
| 3,419,510 | 12/1968 | Hudak | 260—22 T N |
| 3,434,987 | 3/1969 | Dhein et al. | 260—21 |
| 3,437,500 | 4/1969 | Hennig et al. | 260—22 T N |
| 3,471,425 | 10/1969 | Ehring et al. | 260—22 T N |
| 3,474,060 | 10/1969 | Dhein et al. | 260—21 |
| 3,477,977 | 11/1969 | Schnell et al. | 260—22 T N |

FOREIGN PATENTS

| | | | |
|---|---|---|---|
| 1,494,409 | 1/1969 | Germany | 260—22 T N |

DONALD E. CZAJA, Primary Examiner

R. W. GRIFFIN, Assistant Examiner

U.S. Cl. X.R.

117—161 K P; 260—29.2 T N